United States Patent
Wu et al.

(10) Patent No.: US 11,397,377 B2
(45) Date of Patent: Jul. 26, 2022

(54) BRACKET AND ELECTRONIC DEVICE USING SAME

(71) Applicant: Qisda Corporation, Taoyuan (TW)

(72) Inventors: Shin-Hao Wu, Taoyuan (TW); Chin-Chen Kuo, Taoyuan (TW); Hsin-Hung Lin, Taoyuan (TW); Han-Kuang Ho, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/213,341

(22) Filed: Mar. 26, 2021

(65) Prior Publication Data

US 2021/0302814 A1    Sep. 30, 2021

(51) Int. Cl.
  *G03B 21/14*    (2006.01)
  *H04N 9/31*    (2006.01)
  *G03B 21/28*    (2006.01)

(52) U.S. Cl.
  CPC .......... *G03B 21/145* (2013.01); *G03B 21/28* (2013.01)

(58) Field of Classification Search
  CPC ........ G03B 21/00; G03B 21/14; G03B 21/28; G03B 21/29; G03B 21/32; G03B 21/003; G03B 21/2013
  USPC ......... 353/30, 94, 62, 120, 119; 362/249.06, 362/249.14, 249.16, 249.17, 249.18, 362/249.19
  See application file for complete search history.

(56) References Cited

U.S. PATENT DOCUMENTS

| | | | | |
|---|---|---|---|---|
| 1,024,734 | A * | 4/1912 | Massohn et al. .... | G03B 21/003 352/201 |
| 7,901,084 | B2 * | 3/2011 | Willey .................... | G03B 21/30 353/122 |
| 8,690,337 | B2 * | 4/2014 | Nishigaki ............ | H04N 9/3194 353/30 |
| 9,430,096 | B2 * | 8/2016 | Murase ................ | G03B 21/145 |
| 10,168,608 | B2 * | 1/2019 | Stout ................... | G06Q 30/0261 |
| 2007/0097320 | A1 * | 5/2007 | Ullmann ................ | G03B 21/28 353/30 |

* cited by examiner

*Primary Examiner* — William C. Dowling

(57) ABSTRACT

A bracket includes a bracket body and an imaging module. The imaging module includes a first light source, a first pattern plate, a second light source, a second pattern plate and an imaging screen. The first light source projects a first illumination light. The first pattern plate having a first transmissive pattern is located on an optical path of the first illumination light, such that the first illumination light passing through the first transmissive pattern becomes a first pattern light. The second light source projects a second illumination light. The second pattern plate having a second transmissive pattern is located on an optical path of the second illumination light, such that the second illumination light passing through the second transmissive pattern becomes a second pattern light. The imaging screen receives the projection of the first and second pattern light.

17 Claims, 9 Drawing Sheets

BRACKET AND ELECTRONIC DEVICE USING SAME

This application claims the benefit of People's Republic of China application Serial No. 202010231679.0, filed on Mar. 28, 2020, the subject matter of which is incorporated herein by reference.

BACKGROUND OF THE INVENTION

Field of the Invention

The invention relates in general to a bracket and an electronic device using the same, and more particularly to a bracket with an imaging module and an electronic device using the same.

Description of the Related Art

Along with the advance and development in technology, a diversity of electronic devices have become indispensable to people in their daily life. When a consumer purchases an electronic device, the appearance visual effect of the electronic device is a main consideration in addition to the functions of the electronic device. Furthermore, when two electronic devices have identical or similar functions, the consumer is normally inclined towards the one with attractive appearance. Therefore, it has become an essential issue of design to increase the appearance visual effect of the electronic device.

SUMMARY OF THE INVENTION

The present invention relates to a bracket and an electronic device using the same capable of resolving the above problems.

According to one embodiment of the present invention, a bracket is provided. The bracket includes a bracket body and an imaging module. The imaging module is disposed on the bracket body and includes a first light source, a first pattern plate, a second light source, a second pattern plate and an imaging screen. The first light source is configured to project a first illumination light. The first pattern plate has a first transmissive pattern and is located on an optical path of the first illumination light, such that the first illumination light passing through the first transmissive pattern becomes a first pattern light. The second light source is configured to project a second illumination light. The second pattern plate has a second transmissive pattern and is located on an optical path of the second illumination light, such that the second illumination light passing through the second transmissive pattern becomes a second pattern light. The imaging screen is configured to receive the projection of the first pattern light and the second pattern light.

According to another embodiment of the present invention, an electronic device is provided. The electronic device includes a main body and a bracket connected to the main body. The bracket includes a bracket body and an imaging module. The imaging module is disposed on the bracket body and includes a first light source, a first pattern plate, a second light source, a second pattern plate and an imaging screen. The first light source is configured to project a first illumination light. The first pattern plate has a first transmissive pattern and is located on an optical path of the first illumination light, such that the first illumination light passing through the first transmissive pattern becomes a first pattern light. The second light source is configured to project a second illumination light. The second pattern plate has a second transmissive pattern and is located on an optical path of the second illumination light, such that the second illumination light passing through the second transmissive pattern becomes a second pattern light. The imaging screen is configured to receive the projection of the first pattern light and the second pattern light.

According to an alternate embodiment of the present invention, a bracket is provided. The bracket includes a main body and a bracket connected to the main body. The bracket includes a bracket body and an imaging module. The imaging module is disposed on the bracket body and includes a first light source, a first pattern plate, a second light source, a second pattern plate and an imaging screen. The first light source is configured to project a first illumination light. The first pattern plate has a first transmissive pattern and is located on an optical path of the first illumination light, such that the first illumination light passing through the first transmissive pattern becomes a first pattern light. The second light source is configured to project a second illumination light. The second pattern plate has a second transmissive pattern and is located on an optical path of the second illumination light, such that the second illumination light passing through the second transmissive pattern becomes a second pattern light. The imaging screen is configured to receive the projection of the first pattern light and the second pattern light.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
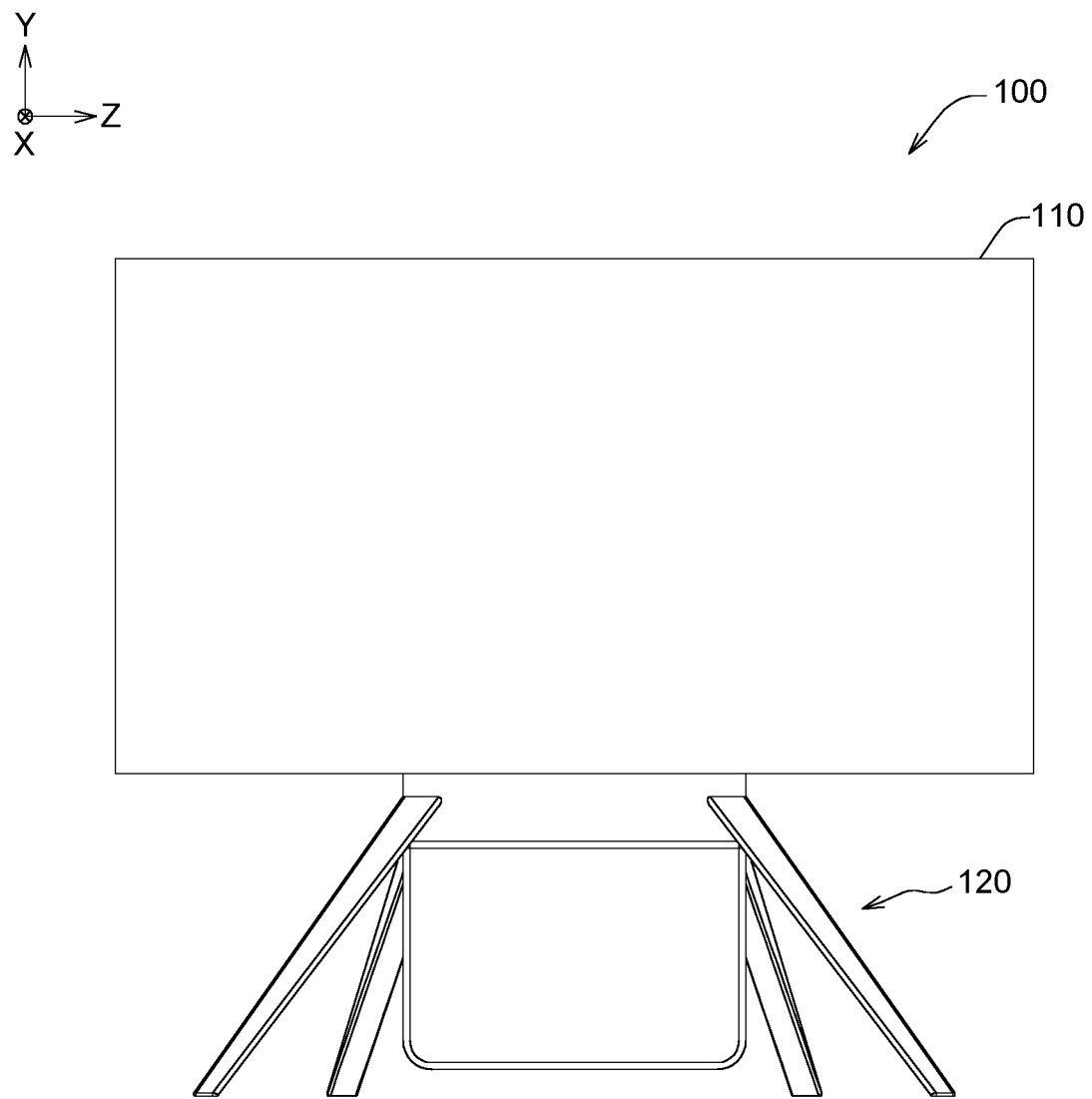
FIG. 1 is a schematic diagram of an electronic device according to an embodiment of the present invention.
Figure 6:
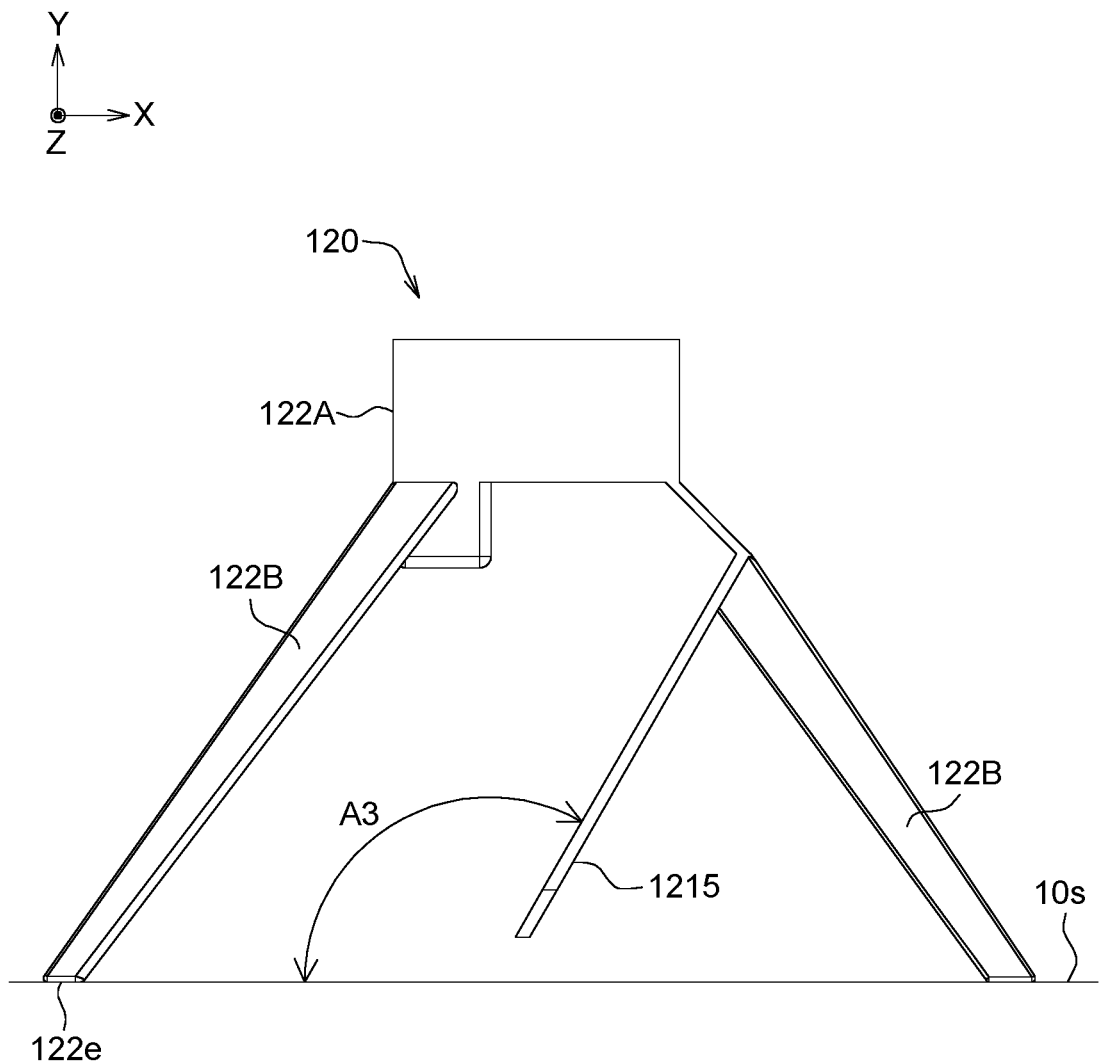
Figure 7:
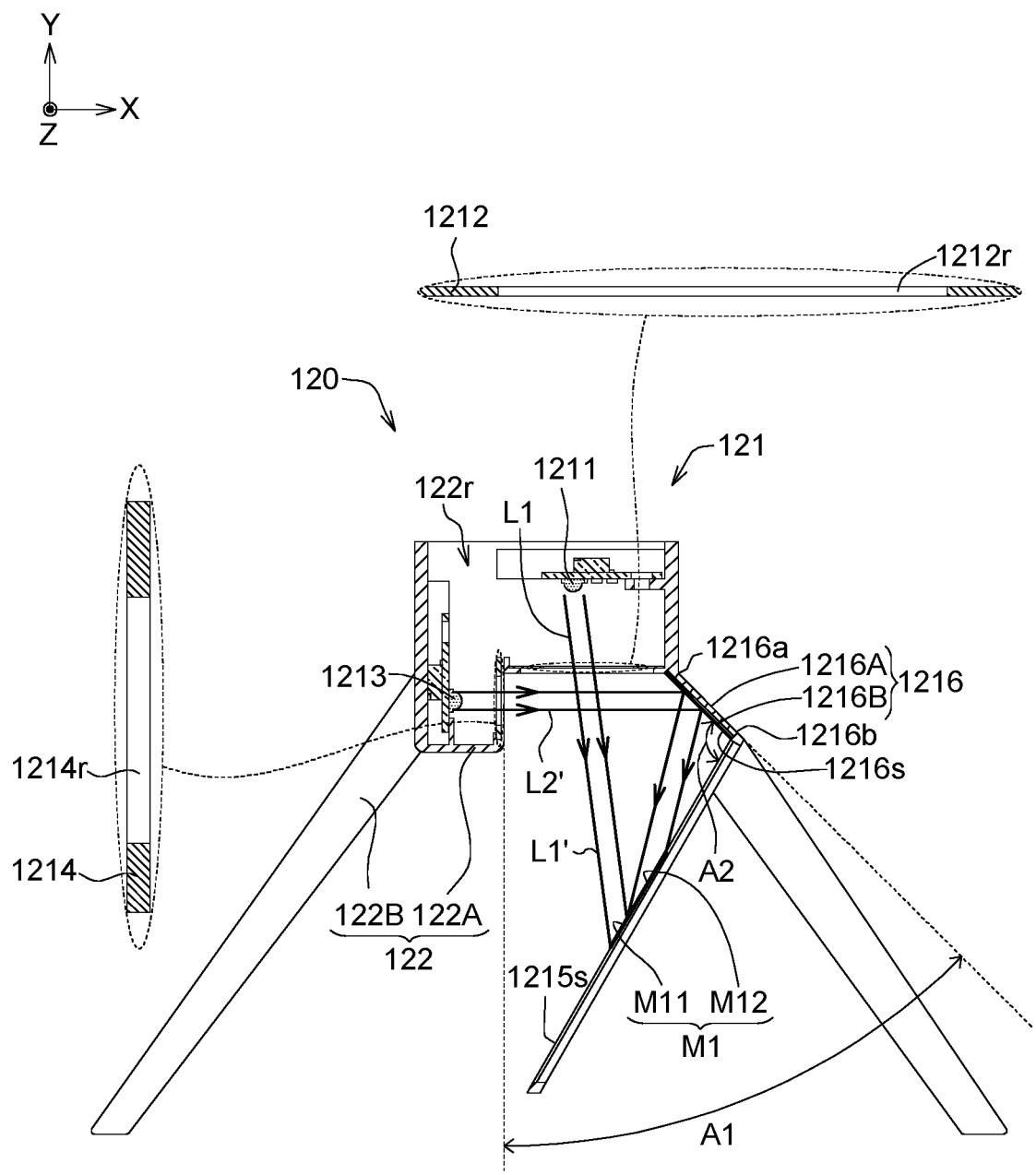
FIG. 7 is a cross-sectional view along a direction 7-7' of the electronic device of FIG. 5.

Refer to FIGS. 1 to 7. FIG. 1 is a schematic diagram of an electronic device 100 according to an embodiment of the present invention. FIGS. 2-6 are schematic diagrams of several view angles of the bracket 120 of FIG. 1. FIG. 7 is a cross-sectional view along a direction 7-7' of the electronic device 120 of FIG. 5.

As indicated in FIG. 1, the electronic device 100 includes a main body 110 and a bracket 120 connected to the main body 110. In the present embodiment, the electronic device 100 is exemplified by a display device, wherein the main body 110 can be realized by a display, the bottom surface 120*b* of the bracket 120 can be placed on a surface 10*s*, such as a desktop, a ground surface or any surface capable of carrying the electronic device 100. In other embodiments, the electronic device 100 is not limited to the display device and can be realized by any device capable of projecting an image such as a projector.

As indicated in FIG. 7, the bracket 120 can project an overlay image. The bracket 120 includes an imaging module 121 and a bracket body 122. The imaging module 121 is disposed on the bracket body 122 and includes a first light source 1211, a first pattern plate 1212, a second light source 1213, a second pattern plate 1214, an imaging screen 1215 and a reflective element 1216. The first light source 1211 is configured to project a first illumination light L1. The first pattern plate 1212 has a first transmissive pattern 1212r and is located on an optical path of the first illumination light L1, such that the first illumination light L1 passing through the first transmissive pattern 1212r becomes a first pattern light L1'. The second light source 1213 is configured to project a second illumination light L2. The second pattern plate 1214 has a second transmissive pattern 1214r and is located on an optical path of the second illumination light L2, such that the second illumination light L2 passing through the second transmissive pattern 1214r becomes a second pattern light L2'. The imaging screen 1215 is configured to receive the projection of the first pattern light L1' and the second pattern light L2'. To summarize, several illumination lights passing through several transmissive patterns through different optical paths become several pattern lights, which can be projected (imaged) on the imaging screen. The pattern lights can be projected (imaged) on the same imaging screen to enrich the colors of the image.

Figure 2:
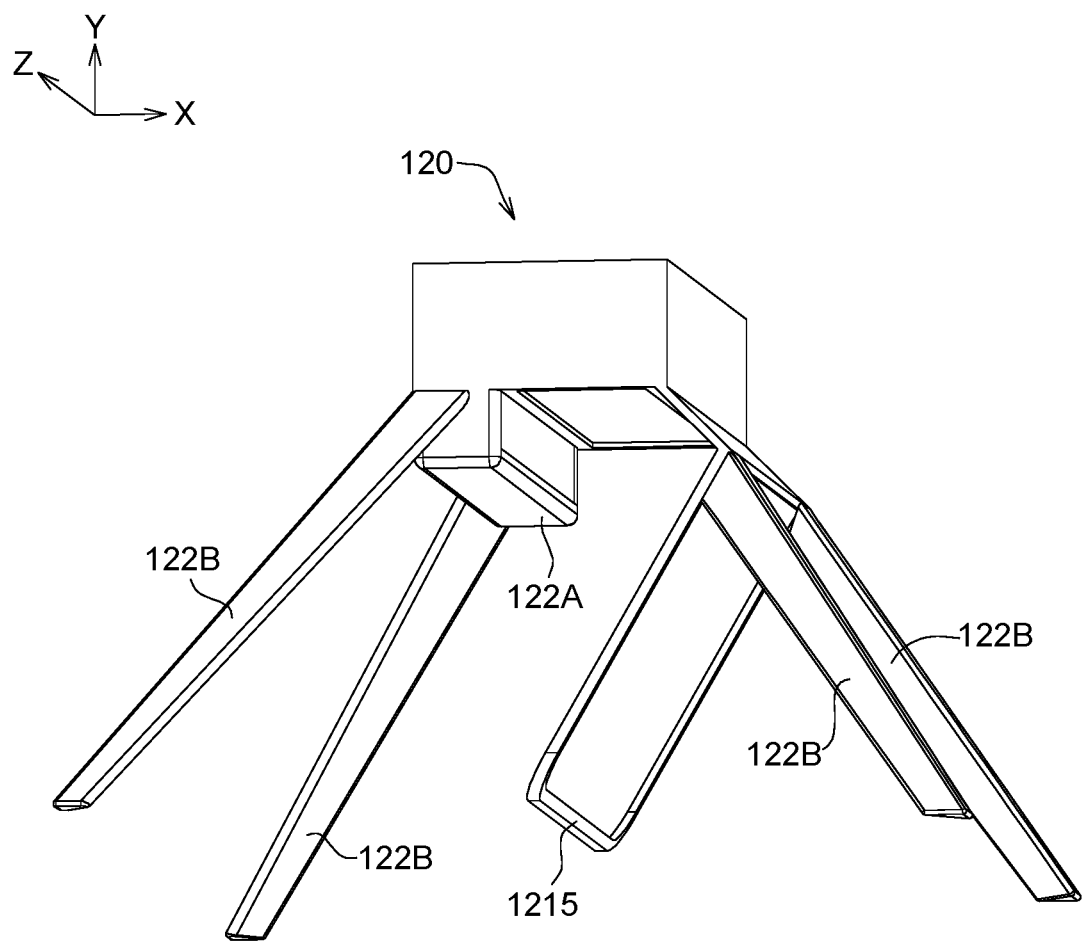
FIGS. 2 to 6 are schematic diagrams of several view angles of the bracket of FIG. 1.
Figure 3:
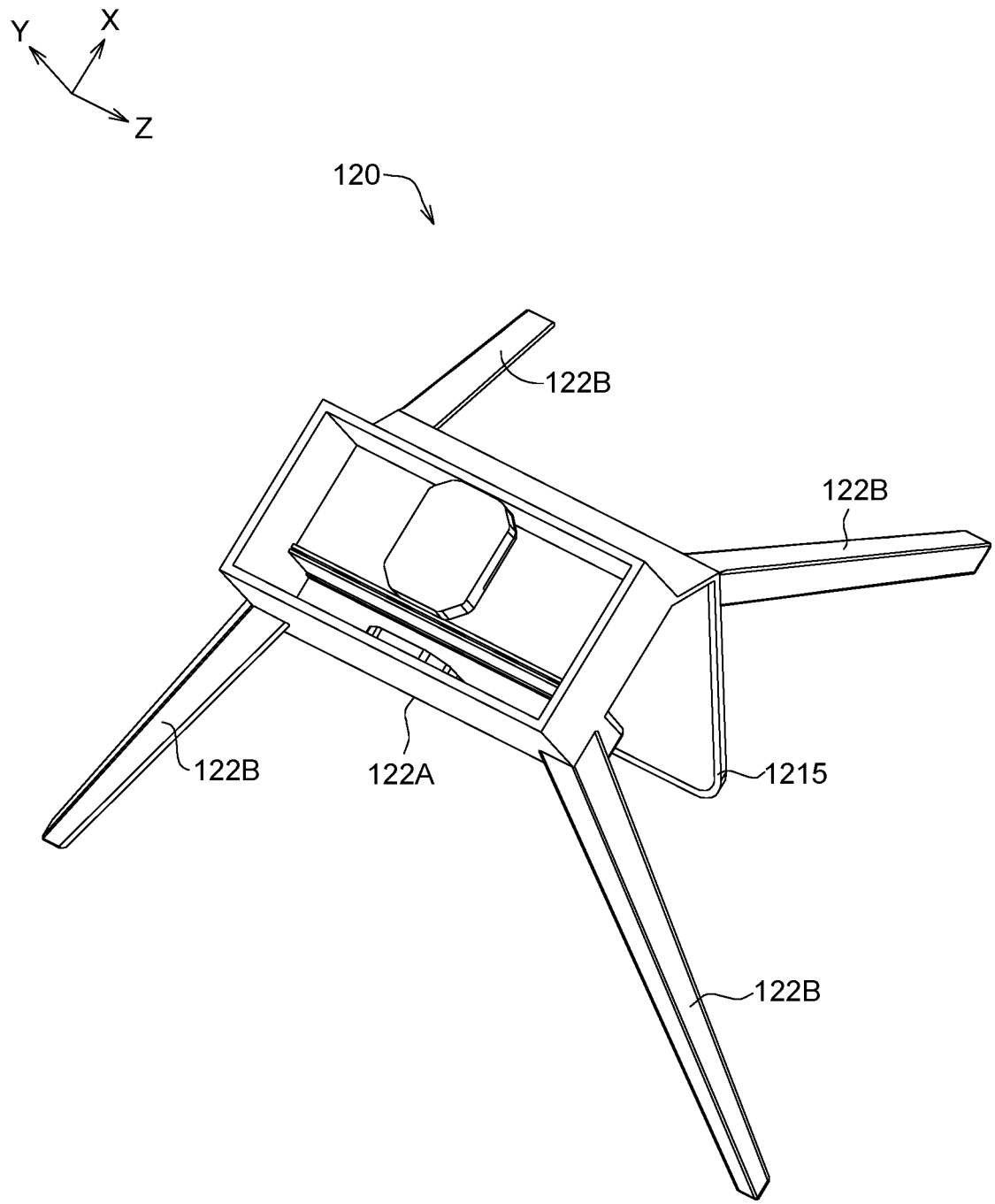
Figure 4:
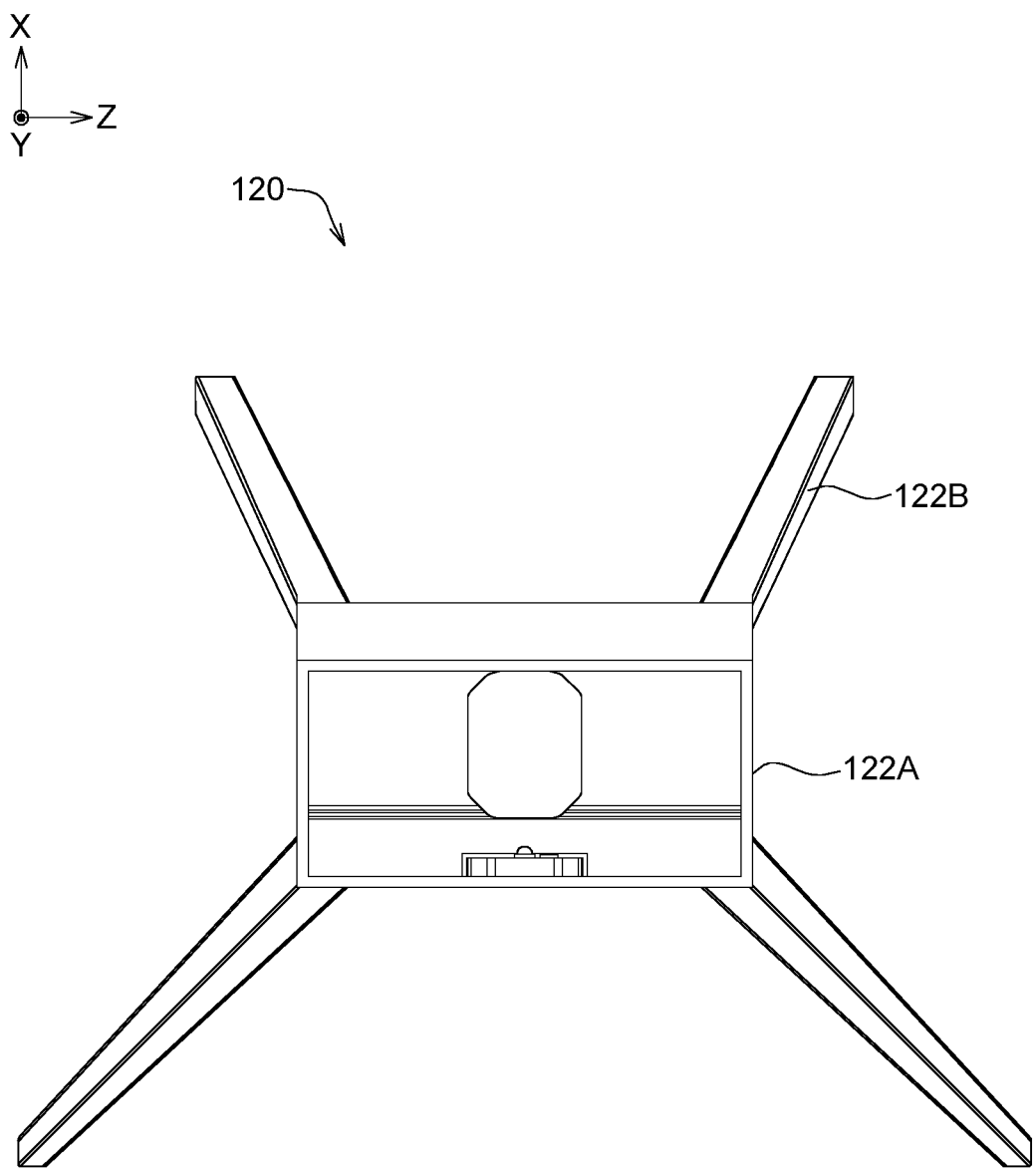
Figure 5:
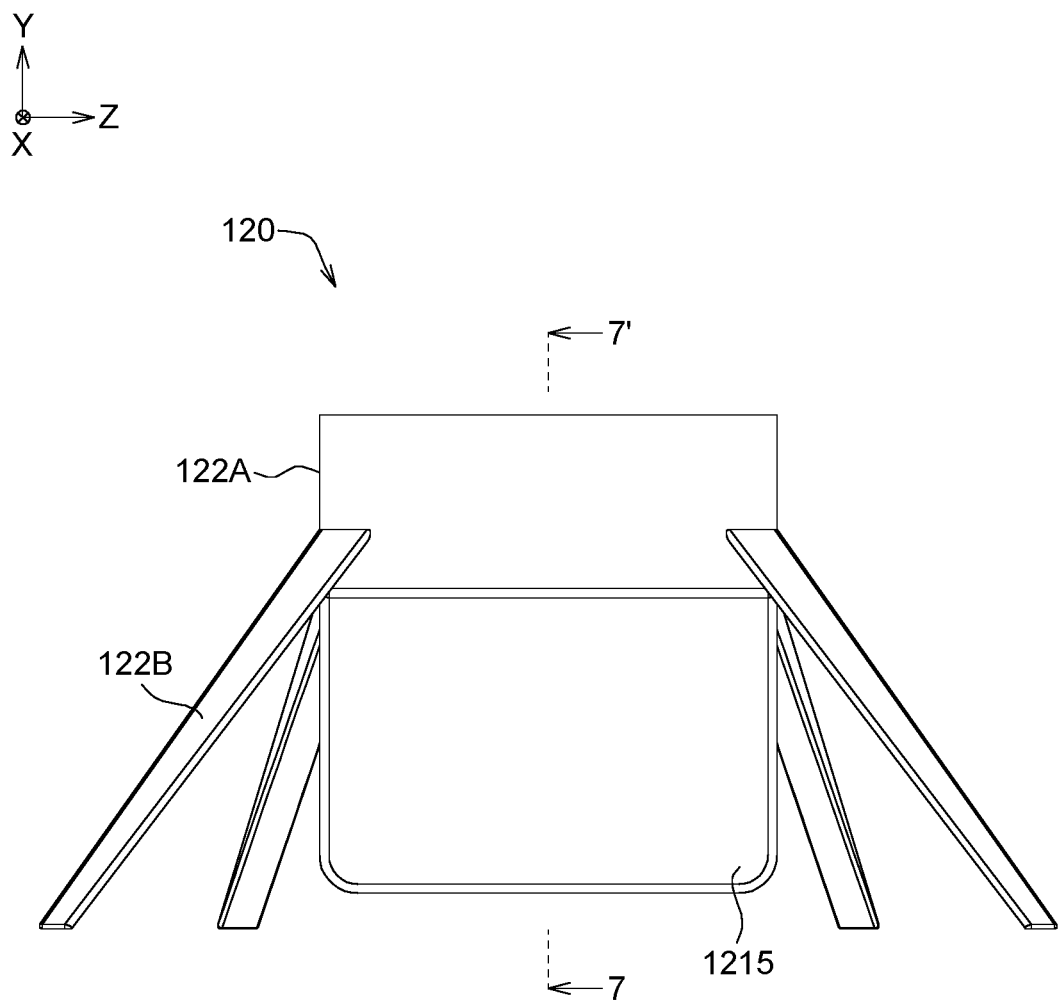

The bracket body 122 has a recess, in which the imaging module 121 is at least partly embedded, and the imaging screen 1215 is exposed from the bracket body 122. As indicated in FIGS. 2 and 7, the bracket body 122 includes a containing box 122A and at least a supporting stand 122b connected to the containing box 122A to support the containing box 122A. The first light source 1211, the first pattern plate 1212, the second light source 1213 and the second pattern plate 1214 are disposed in the recess 122r of the containing box 122A. The reflective element 1216 and the imaging screen 1215 are disposed outside the recess 122r. Since the imaging screen 1215 is exposed outside the bracket body 122, the projected image on the imaging screen 1215 can be viewed. As indicated in FIG. 6, an angle A3 is formed between the imaging screen 1215 and the bottom surface 122e of the bracket body 122 and is in a range of about 45° to 55°, such that the projected image on the imaging screen 1215 is within a range of better or best view angle to the viewer.

In an embodiment, since relative relations between the first light source 1211, the first pattern plate 1212, the second light source 1213 and the second pattern plate 1214 are fixed, the stability of the above elements and the imaging optical path becomes more stable.

As indicated in FIG. 7, the first pattern light L1' is projected on the imaging screen 1215 to form a first image M11, and the second pattern light L2' is projected on the imaging screen 1215 to form a second image M12. In an embodiment, the first transmissive pattern 1212r and the second transmissive pattern 1214r together form an imaging pattern, such as logo, price, or product information. The first transmissive pattern 1212r is a part of the imaging pattern, and the second transmissive pattern 1214r is the remaining part of the imaging pattern. The first image M11 projected on the imaging surface 1215s of the imaging screen 1215 through the first transmissive pattern 1212r and the second image M12 projected on the imaging surface 1215s of the imaging screen 1215 through the second transmissive pattern 1214r together form a complete imaging pattern (such as image M1). Or, both the first transmissive pattern 1212r and the second transmissive pattern 1214r are a complete imaging pattern, but the first image M11 projected on the imaging surface 1215s of the imaging screen 1215 through the first transmissive pattern 1212r is different from the second image M12 projected on the imaging surface 1215s of the imaging screen 1215 through the second transmissive pattern 1214r in terms of size and/or light colors.

In an embodiment, since the first transmissive pattern 1212r and the second transmissive pattern 1214r are two different patterns, the first image M11 and the second image M12 are different pattern images. However, the first transmissive pattern 1212r and the second transmissive pattern 1214r can be identical patterns, such that the first image M11 and the second image M12 are identical images. In an embodiment, the first pattern light L1' (corresponding to the first image M11) and the second pattern light L2' (corresponding to the second image M12) projected on the imaging screen 1215 can overlap partly or do not overlap at all. Additionally, the light color of the first illumination light L1 is identical to that of the first pattern light L1' are identical, and the light color of the second illumination light L2 is identical to that of the second pattern light L2' as well. In an embodiment, the first illumination light L1 and/or the second illumination light L2 each can be realized by a red light, a green light, a blue light or a combination thereof. The light color of the first illumination light L1 and that of the second illumination light L2 can be different, such that the first image M11 and the second image M12 projected on the imaging screen 1215 are even more colorful. In another embodiment, the light color of the first illumination light L1 can be identical to that of the second illumination light L2.

Besides, the first light source 1211 can emit a first illumination light L1 with variable light colors and/or the second light source 1213 can emit a second illumination light L2 with variable light colors, such that the first pattern light L1' and the second pattern light L2' projected on the imaging screen 1215 are even more colorful. Also, the first light source 1211 and/or the second light source 1213 each can be realized by a light emitting diode, a laser light source or any light emitting element capable of emitting a color light.

As indicated in FIG. 7, the first transmissive pattern 1212r of the first pattern plate 1212 is a transmissive portion. For example, the first transmissive pattern 1212r is a penetration portion; or, the first pattern plate 1212 is a physical material, wherein the physical area of the first transmissive pattern 1212r has a transmittance greater than 90%. The second transmissive pattern 1214r of the second pattern plate 1214 is a transmissive portion. For example, the second transmissive pattern 1214r is a penetration portion; or, the second pattern plate 1214 is a physical material, wherein the physical area of the second transmissive pattern 1214r has a transmittance greater than 90%.

The imaging screen 1215 can be formed of a transmissive plate and allows the first pattern light L1' and the second pattern light L2' to be projected on the imaging surface 1215s. In terms of materials, the imaging screen 1215 can be formed of a transmissive acrylic plate. In another embodiment, the imaging screen 1215 can be formed of an opaque plate.

As indicated in FIG. 7, the reflective element 1216 is located on an optical path of the second pattern light L2' and is configured to reflect the second pattern light L2' to the imaging screen 1215. In other words, the reflective element 1216 can adjust the optical path of the second pattern light L2' to reflect the second pattern light L2' to the imaging screen 1215. In another embodiment, the reflective element 1216 can be omitted if the second pattern light L2' can be directly projected on the imaging screen 1215. As indicated in FIG. 7, the reflective element 1216 includes a carrier 1216A and a reflector 1216B disposed on the carrier 1216A. The reflective element 1216 is connected to the containing box 122A and the imaging screen 1215 through the carrier 1216A.

As indicated in FIG. 7, the reflective element 1216 is connected to the first pattern plate 1212. For example, the reflective element 1216 is connected to the first pattern plate 1212 through the containing box 122A. An angle A2 formed between the reflective surface 1216s of the reflective element 1216 and the imaging surface 1215s of the imaging screen 1215 is substantially equivalent to, smaller than or greater than 90°. Through suitable design of the angle A2, the position and/or size of the second image M12 projected on the imaging screen 1215 can be adjusted.

Moreover, an angle A1 is formed between the reflective element 1216 and the second pattern plate 1214. As indicated in FIG. 7, the reflective element 1216 includes a first connecting portion 1216a and a second connecting portion 1216b. The first connecting portion 1216a is connected to the containing box 122A (indirectly connected to the first pattern plate 1212), and the second connecting portion 1216b is connected to the imaging screen 1215, wherein the second connecting portion 1216b is farther away from the second pattern plate 1214 than the first connecting portion 1216a. In other words, the second connecting portion 1216b of the reflective element 1216 is extended outwards relative to the second pattern plate 1214 to be connected to the containing box 122A, and the angle A1 formed between the reflective element 1216 and the second transmissive pattern 1214r is an acute angle. In an embodiment, the angle A1 is in a range of 35° to 40°, but the embodiment of the present invention is not limited thereto. Through suitable design of the angle A1, the position and/or size of the second image M12 projected on the imaging screen 1215 can be adjusted.

As indicated in FIG. 7, the first pattern plate 1212 faces the imaging screen 1215, such that the first pattern light L1' emitted from the first pattern plate 1212 can be projected on the imaging screen 1215. In terms of the optical path, in an embodiment, the optical path of the first pattern light L1' from the first pattern plate 1212 to the imaging screen 1215 does not pass through any physical elements. In other words, the first pattern light L1 emitted from the first pattern plate 1212 is directly projected on the imaging screen 1215. Besides, the second pattern plate 1214 faces the reflective element 1216, such that the second pattern light L2' emitted from the second pattern plate 1214 can be projected on the reflective element 1216. In terms of the optical path, in an embodiment, the optical path of the second pattern light L2' from the second pattern plate 1214 to the imaging screen 1215 only passes through the reflective element 1216. In other words, the second pattern light L2' is reflected to the imaging screen 1215 by the reflective element 1216.

Figure 8:
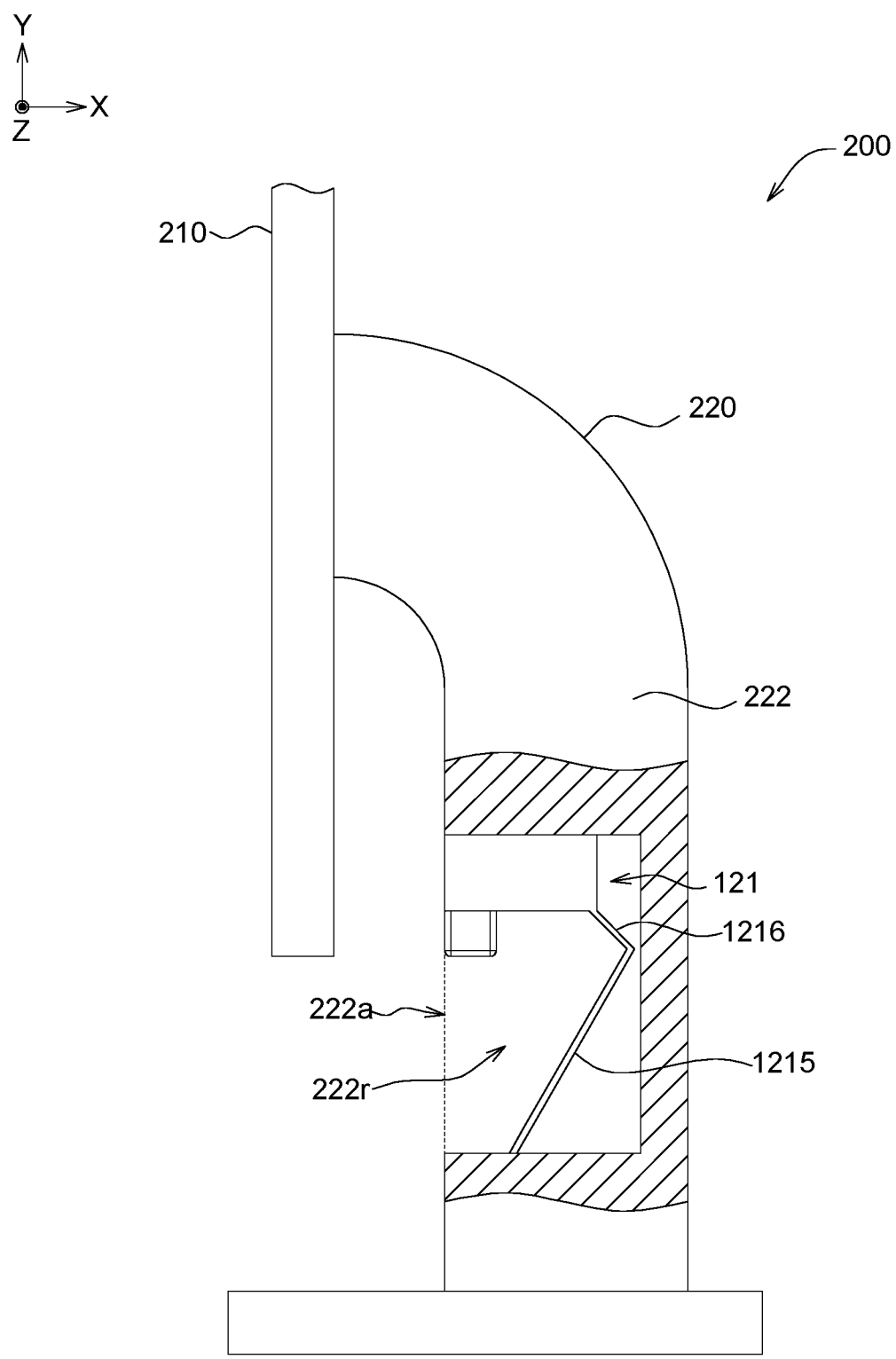
FIG. 8 is a schematic diagram of an electronic device according to another embodiment of the present invention.

Referring to FIG. 8, a schematic diagram of an electronic device 200 according to another embodiment of the present invention is shown. The electronic device 200 includes a main body 210 and a bracket 220 connected to the main body 210. In the present embodiment, the electronic device 200 is exemplified by a display device, wherein the main body 210 can be realized by a display. The bracket 220 includes an imaging module 121 and a bracket body 222. The imaging module 121 is disposed on the bracket body 222 and includes a first light source 1211 (not illustrated), a first pattern plate 1212 (not illustrated), a second light source 1213 (not illustrated), a second pattern plate 1214 (not illustrated), an imaging screen 1215 and a reflective element 1216. In the present embodiment, technical features of the electronic device 200 are identical or similar to that of the electronic device 100 except that the bracket body 222 has a recess 222r in which the imaging module 121 can be entirely located. The recess 222r has an opening 222a from which the imaging screen 1215 is exposed and can be viewed.

Figure 9:
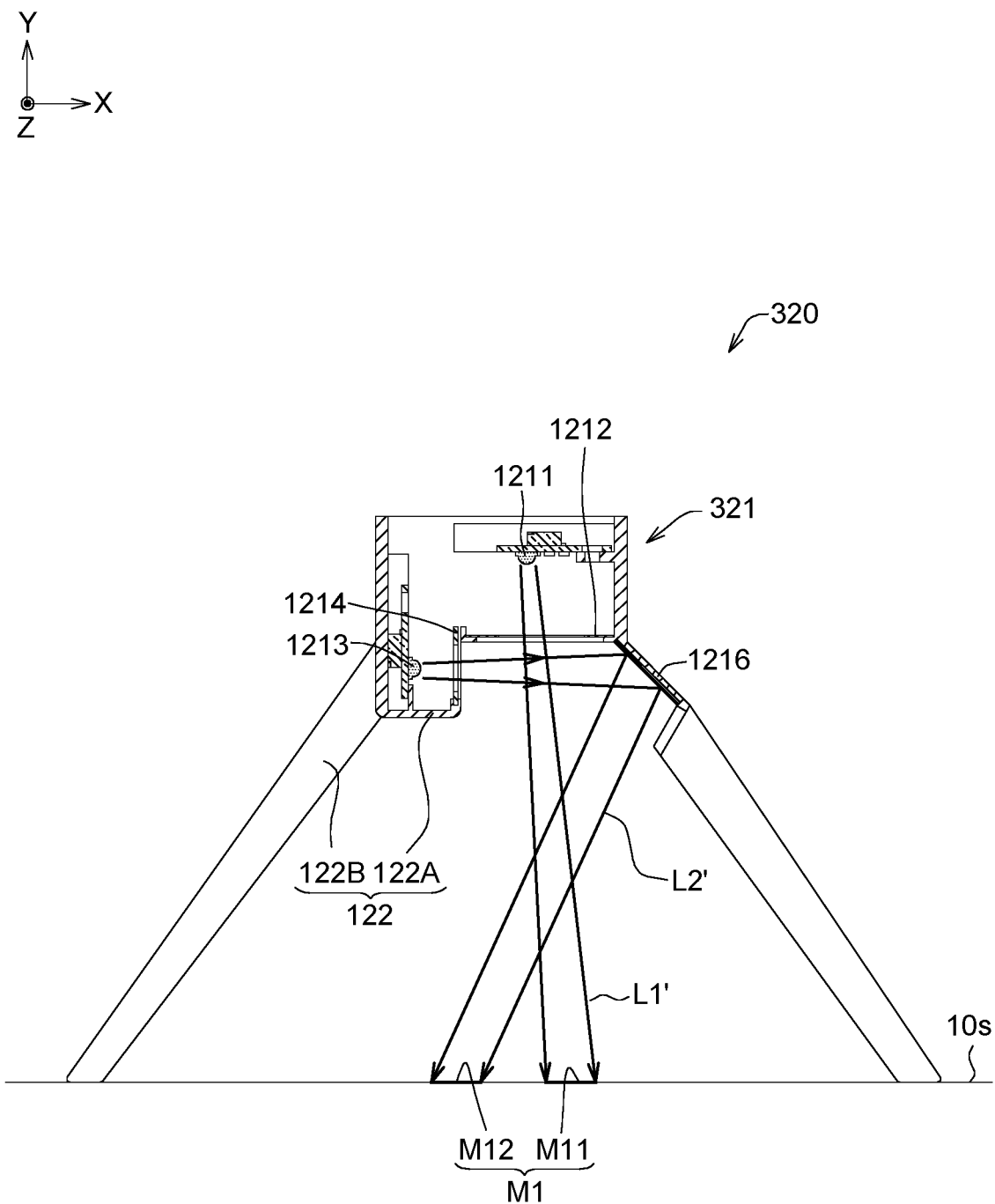
FIG. 9 is a schematic diagram of a bracket according to another embodiment of the present invention is shown.

Referring to FIG. 9, a schematic diagram of a bracket 320 according to another embodiment of the present invention is shown. The bracket 320 can be connected to the main body 110 of FIG. 1, but the embodiment of the present invention is not limited thereto. The bracket 320 includes an imaging module 321 and a bracket body 122. The imaging module 321 is disposed on the bracket body 122 and includes a first light source 1211, a first pattern plate 1212, a second light source 1213, a second pattern plate 1214 and a reflective element 1216. In the present embodiment, technical features of the bracket 320 are identical or similar to that of the bracket 120 except that the imaging module 321 of the bracket 320 can omit the imaging screen 1215, such that the first pattern light L1' passing through the first pattern plate 1212 and the second pattern light L2' passing through the second pattern plate 1214 can be projected on a surface 10s outside the bracket body 122, wherein the surface 10s can be a plane or a curved surface.

As disclosed in above embodiments of the present invention, several illumination lights emitted by the light source of the imaging module pass through several patterns and become several pattern lights projected on a surface to form several images, such that the appearance visual effect and/or product information presentation (the projected image can display product information such as logo, models, functions, and prices) of the imaging module and/or the electronic device can be enhanced. Since the structural design of the bracket is simple, the invention can effectively enhance the appearance visual effect of the imaging module and/or the electronic device to stimulate consumers' purchase desire without causing too much increase to the manufacturing cost.

While the invention has been described by way of example and in terms of the preferred embodiment (s), it is to be understood that the invention is not limited thereto. On the contrary, it is intended to cover various modifications and similar arrangements and procedures and the scope of the appended claims therefore should be accorded the broadest interpretation so as to encompass all such modifications and similar arrangements and procedures.

What is claimed is:
1. A bracket, comprising:
a bracket body; and
an imaging module, which is disposed on the bracket body and comprises:
a first light source configured to project a first illumination light;
a first pattern plate, which has a first transmissive pattern and is located on an optical path of the first illumination light, such that the first illumination light passing through the first transmissive pattern becomes a first pattern light;
a second light source configured to project a second illumination light;
a second pattern plate, which has a second transmissive pattern and is located on an optical path of the second illumination light, such that the second illumination light passing through the second transmissive pattern becomes a second pattern light; and an imaging screen configured to receive projection of the first pattern light and the second pattern light;

wherein the bracket further comprises:

a reflective element located on an optical path of the second pattern light and configured to reflect the second pattern light to the imaging screen;

wherein the first pattern plate faces the imaging screen, and the second pattern plate faces the reflective element.

2. The bracket according to claim 1, wherein the optical path of the second pattern light from the second pattern plate to the imaging screen only passes through the reflective element.

3. The bracket according to claim 1, wherein the optical path of the first pattern light from the first pattern plate to the imaging screen does not pass through any physical element.

4. The bracket according to claim 1, wherein the bracket body comprises a containing box in which the first light source, the first pattern plate, the second light source and the second pattern plate are disposed.

5. The bracket according to claim 1, wherein the reflective element is connected to the first pattern plate and the imaging screen.

6. The bracket according to claim 1, wherein a reflective surface of the reflective element and an imaging surface of the imaging screen are perpendicular to each other.

7. The bracket according to claim 1, wherein the reflective element comprises a first connecting portion and a second connecting portion, the first connecting portion is connected to the first pattern plate, and the second connecting portion is connected to the imaging screen; an acute angle is formed between the reflective element and the second pattern plate, and the second connecting portion is far away from the second pattern plate than the first connecting portion.

8. The bracket according to claim 7, wherein the acute angle is in a range of 35° to 40°.

9. The bracket according to claim 1, wherein the first pattern plate and the second pattern plate are perpendicular to each other.

10. The bracket according to claim 1, wherein the projection of the first pattern light on the imaging screen overlaps projection of the second pattern light on the imaging screen.

11. The bracket according to claim 1, wherein the light color of the first illumination light is different from that of the second illumination light.

12. The bracket according to claim 1, wherein the first pattern is different from the second pattern.

13. The bracket according to claim 1, wherein the bracket body has a recess in which the imaging module is at least partly embedded, and the imaging screen is exposed from the bracket body.

14. The bracket according to claim 1, wherein the angle between the imaging screen and a bottom surface of the bracket body is in a range of 45° and 55°.

15. An electronic device, comprises:
a main body; and
a bracket, connected to the main body and comprising:
a bracket body; and
an imaging module, which is disposed on the bracket body and comprises:
a first light source configured to project a first illumination light;
a first pattern plate, which has a first transmissive pattern and is located on an optical path of the first illumination light, such that the first illumination light passing through the first transmissive pattern becomes a first pattern light;
a second light source configured to project a second illumination light;
a second pattern plate, which has a second transmissive pattern and is located on an optical path of the second illumination light, such that the second illumination light passing through the second transmissive pattern becomes a second pattern light; and
an imaging screen configured to receive projection of the first pattern light and the second pattern light;
wherein the bracket further comprises:
a reflective element located on an optical path of the second pattern light and configured to reflect the second pattern light to the imaging screen;
wherein the first pattern plate faces the imaging screen, and the second pattern plate faces the reflective element.

16. A bracket, comprising:
a bracket body having a recess; and
an imaging module, which is at least partly embedded in the recess and comprises:
a first light source configured to project a first illumination light;
a first pattern plate, which has a first transmissive pattern and is located on an optical path of the first illumination light, such that the first illumination light passing through the first transmissive pattern becomes a first pattern light projected on a surface;
a second light source configured to project a second illumination light;
a second pattern plate, which has a second transmissive pattern and is located on an optical path of the second illumination light, such that the second illumination light passing through the second transmissive pattern becomes a second pattern light; and
a reflective element located on an optical path of the second pattern light and configured to reflect the second pattern light to the surface on which the second pattern light overlaps the first pattern light;
wherein the imaging module further comprises an imaging screen configured to receive projection of the first pattern light and projection of the second pattern light.

17. The bracket according to claim 16, wherein the first pattern light and the second pattern light are projected on the surface located outside the bracket body.

* * * * *